United States Patent [19]

D'Arcy

[11] Patent Number: 5,016,251
[45] Date of Patent: May 14, 1991

[54] Q-SWITCH DRIVER

[75] Inventor: John D'Arcy, Belmont, Calif.

[73] Assignee: Spectra Physics, LPD, Mountain View, Calif.

[21] Appl. No.: 500,674

[22] Filed: Mar. 28, 1990

[51] Int. Cl.$^5$ .............................................. H01S 3/11
[52] U.S. Cl. ...................................... 372/10; 372/25; 372/38; 372/29
[58] Field of Search ...................... 372/10, 25, 38, 69, 372/32, 29

[56] References Cited

U.S. PATENT DOCUMENTS

| | | | |
|---|---|---|---|
| 4,337,442 | 6/1982 | Mauck | 372/29 |
| 4,412,330 | 10/1983 | Mauck et al. | 372/29 |
| 4,930,901 | 6/1990 | Johnson et al. | 372/69 |

OTHER PUBLICATIONS

Koechner, *Solid-State Laser Engineering*, 2d ed., pp. 402-446, Springer-Verlag (1988).

Primary Examiner—Léon Scott, Jr.
Attorney, Agent, or Firm—Fliesler, Dubb, Meyer & Lovejoy

[57] ABSTRACT

An apparatus and a method for precisely controlling long-pulse beam intensity in a laser device having a gain medium and a Q-switch disposed in a resonant cavity, and having a pump for supplying constant pulses of energy to the gain medium. The apparatus provides a Q-switch controller for adjustably controlling a timing window during which the Q-switch is open, to define the amount of pump energy coupled into the long pulses, and consequently the intensity of the beam. The controller has an input device for entering a desired length of the timing window, and a display device for displaying an indication of the length.

17 Claims, 3 Drawing Sheets

Q-SWITCH DRIVER

BACKGROUND OF THE INVENTION

1. Field of the Invention

The present invention relates to Q-switching apparatus for use in controlling laser emission. More particularly, it relates to a controller for controlling a Q-switch of a laser device operating in a long-pulse mode.

2. Description of the Related Art

A typical switched cavity laser system includes a gain medium and a Q-switch disposed in a resonant cavity, and a pump, such as a flash lamp, for providing energy to the gain medium. The Q-switch toggles the Q factor of the cavity between high and low values, to allow or prevent lasing action, respectively, according to a variety of operating modes. The fundamentals of laser Q-switching are taught in Koechner, *Solid-State Laser Engineering*, 2d ed., pp. 402–446, Springer-Verlag (1988), and are incorporated herein by reference.

The Q-switch is generally used in "short-pulse" mode, to generate output laser beam pulses of very short duration but high intensity. In this mode, the Q-switch is closed and the pump is turned on. The Q-switch is reopened after the pump has stored energy in the form of a population inversion Within the gain medium. When the Q-switch is opened, a short pulse of laser energy is generated. Short-pulse beams are useful in many high-energy applications of the laser device, such as drilling or machining of a workpiece.

However, lower intensity beams are required for alignment and adjustment of the resonant cavity, for pre-drilling focusing or aiming of the beam, and for other purposes. In such applications, the high-intensity pulses of the short-pulse mode might damage alignment or testing equipment, or might cause drilling to occur at unwanted points on the workpiece.

To produce lower intensity pulses, these switched cavity systems are operated in a "long-pulse" mode. In the long-pulse mode, the Q-switch is opened at the same time the pump is turned on, so that no energy is stored in the gain medium, and the pump energy is coupled directly into the output beam. The Q-switch is closed at a fixed time later, normally after shutting off the pump. Long-pulse mode operation generates relatively long duration pulses of laser energy of relatively low intensity.

The energy of a long-pulse beam has been controlled in the prior art by controlling the intensity of the pump energy. However, pump control devices are costly and unwieldy, and provide minimal precision in controlling the long-pulse mode. A need exists for an inexpensive and convenient apparatus and method of providing precise control over the long-pulse operation of a laser device.

SUMMARY OF THE INVENTION

The present invention provides an apparatus and a method for precisely controlling long-pulse beam intensity in a laser device having a gain medium and a Q-switch disposed in a resonant cavity, and having a pump for supplying constant pulses of energy to the gain medium. The apparatus provides a Q-switch controller for adjustably controlling a timing window during which the Q-switch is open, to define the amount of pump energy coupled into the long pulses, and consequently the intensity of the output beam. The controller has an input device for entering a desired length of the timing window, and a display device for displaying an indication of the length.

The controller coordinates the opening and closing of the Q-switch with the pulse of the pump. The timing window is established between a first point in time T1 when the Q-switch is opened and the pump is triggered, and a later, second point in time T2 when the Q-switch is closed but before the pulse of pump energy ends. Shortening and lengthening the timing window between T1 and T2 reduce and increase, respectively, the amount of pump energy coupled into the long pulse.

Accordingly, the intensity of laser output in the long-pulse mode is controlled without requiring adjustment of the pump energy. Other aspects and advantages of the present invention can be seen upon review of the drawings, the detailed description, and the claims which follow.

DETAILED DESCRIPTION OF THE PREFERRED EMBODIMENT

Figure 1:
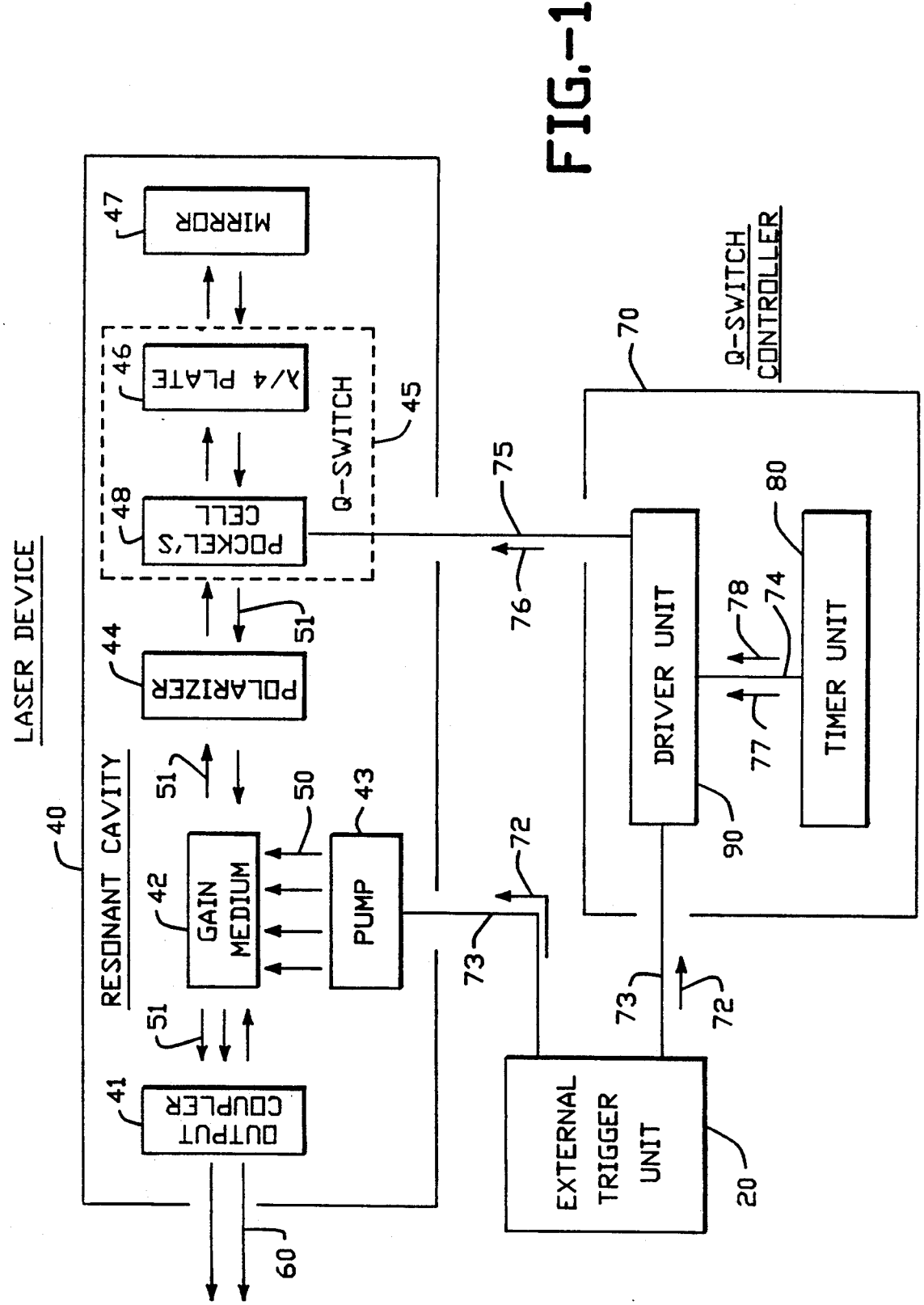
FIG. 1 shows the Q-switch controller of the present invention coupled to a laser device and an external trigger unit, and depicts the operation of the laser device.

FIG. 1 shows the Q-switch controller 70 of the present invention, for use with a laser device 30. Disposed within the laser device's resonant cavity 40 are an output coupler 41, a gain medium 42 such as Nd:YLF, a pump 43 such as a flash lamp, a polarizer 44, a Q-switch 45 including a Pockels cell 48 and a quarter-wave plate 46, and a rear mirror 47. The pump is coupled to receive a trigger signal 72 from an external trigger unit 20, and the Q-switch 45 is coupled to receive a control signal 76 from the controller 70 of the present invention.

The Q-switch controller 70 has a timer unit 80 and a driver unit 90. The controller 70 is coupled to provide a control signal 76 to the Q-switch 45 via a control line 75. The controller 70 and the pump 43 receive a trigger signal 72 from the external trigger unit via a trigger line 73, which may be a two-line bus.

Figure 2:
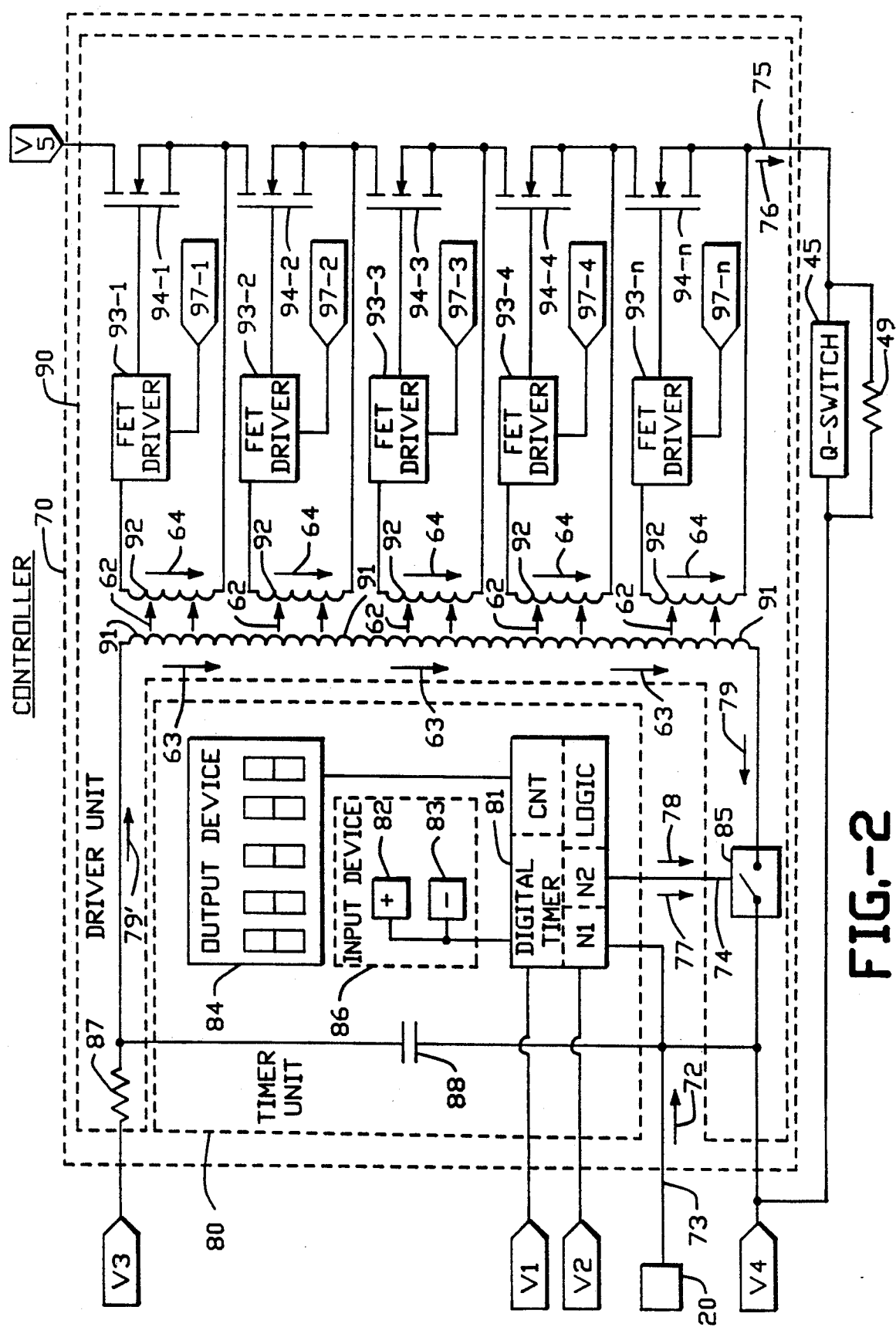
FIG. 2 shows the components of the timer and driver units of the Q-switch controller of the present invention.

FIG. 2 depicts the components of one embodiment of the controller 70 of the present invention. The logic components of the timer unit 80 are powered by external power signals V1 and V2. The timer unit 80 is coupled to receive a trigger signal 72 from the external trigger unit 20.

The timer unit 80 has a digital timer 81, which is coupled to an input device 86. The digital timer 81 is also coupled to a display device 84. In one mode, the input device 86 has a first and a second button 82 and 3, and the display device 84 is an LED array 84. The digital timer 81 has control logic LOGIC, a counter CNT, and storage, such as registers, for first and second numbers N1 and N2.

The digital timer 81 is coupled to a control switch 85 of the driver unit 90 by a signal line 74. The switch 85 is coupled to receive an external power signal V4, and to the main transformer coil 91. The main transformer coil 91 is coupled through a resistor 87 to receive an external power signal V3. A capacitor 88 is coupled to the resistor 87, and is also coupled to receive the external power signal V4.

The driver unit 90 has a plurality of secondary coils 92 which are coupled to the main transformer coil 91. Each secondary coil 92 is coupled on one end through an FET driver 93 to switch a power FET 94, and is also coupled on the other end directly to the source of its respective FET 94-1 to 94-n. The FET's 94-1 to 94-n are connected in series, drain to source, with the drain of a first FET 94-1 being coupled to receive an external power signal V5. The source of a last FET 94-n of the FET's 94 is coupled to the control line 75. Each FET driver 93-1 to 93-n is separately coupled to receive a power signal from an external power supply 97-1 to 97-n. In one embodiment, each external power supply 97-1 to 97-n provides a 20 volt DC potential.

In one embodiment, there may be five secondary coils 92 with associated FET's 94 and FET drivers 93, but other compliments may be appropriate. For example, a single secondary coil, FET, and FET driver could be employed, if the single FET were capable of both delivering and withstanding the thousands of volts typically required to operate a Pockels cell, or if a less demanding Pockels cell were used in the laser device.

Figure 3:
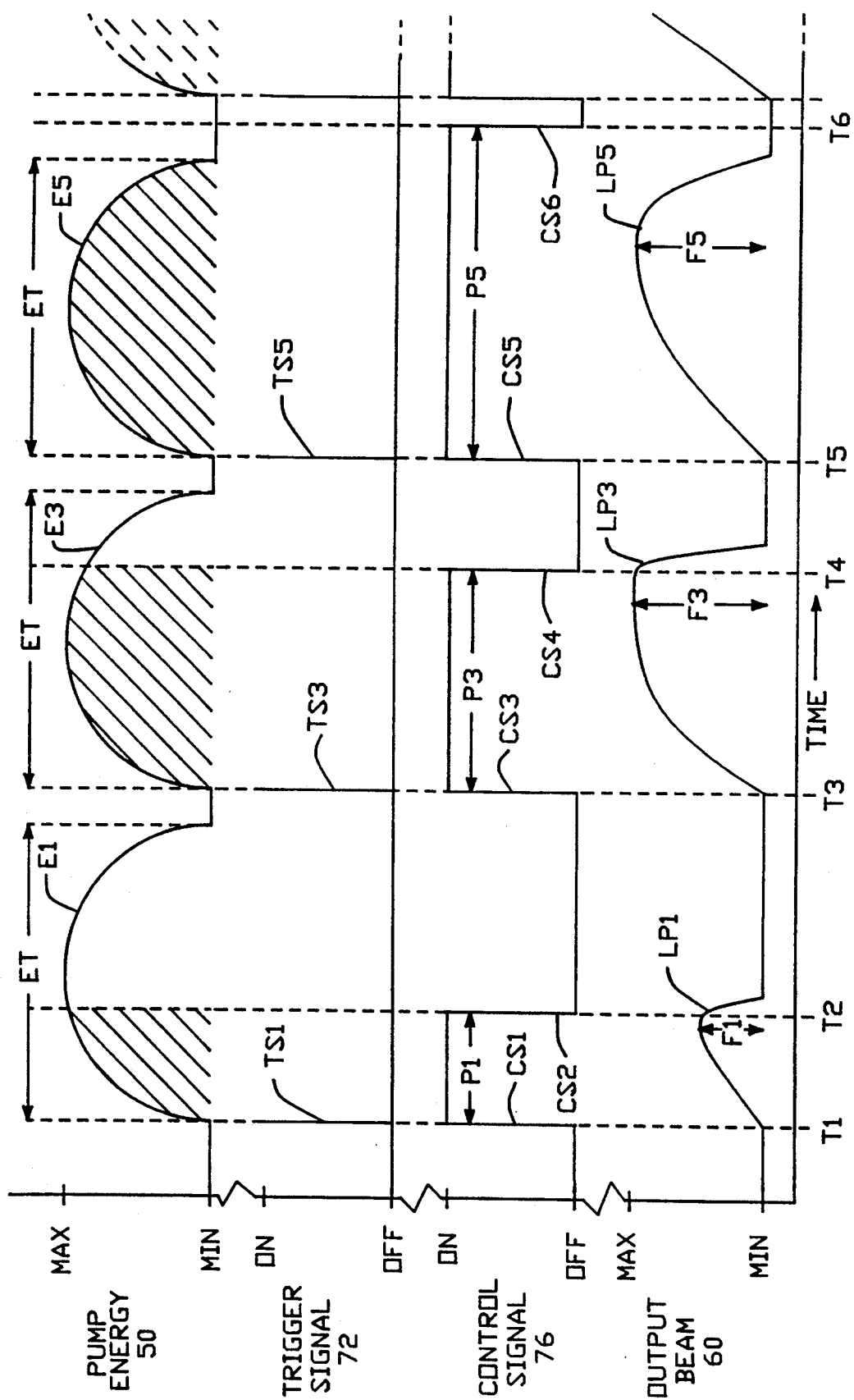
FIG. 3 is a heuristic signal graph showing variation of the duration and energy of long pulses produced by varying the period of time between the provision of two Q-switch control signals, without varying the pump energy.

The driver unit 90 and the timer unit 80 operate to provide various control signals to the laser device 40, as will be understood with reference to FIGS. 2 and 3. In response to the arrival of a trigger signal 72 from the external trigger unit 20, control logic LOGIC begins stepping the counter CNT from the first number N1, and generates an "ON" signal 77. The ON signal 77 causes the driver unit 90 to issue a first control signal CS1 by raising the control signal 76, which electronically closes the high-speed FET switch 85. The closing of the switch 85 completes the circuit from the external power signal V3, through the resistor 87, the main coil 91, and the switch 85, to the external power signal V4. A voltage difference between the external power signals V3 and V4 causes a current 63 to flow through the main transformer coil 91.

A current 64 is induced in the secondary coils 92, which closes the high voltage FET's 94. The closing of the high voltage FET's 94 allows power to flow from the external power signal V5 to the control line 75. The beginning of the flow of this power is what constitutes the first control signal CS1.

As long as the FET switch 85 remains closed, current 63 will flow from the capacitor 88 through the main transformer coil 91, and the control signal 76 will remain on. The capacitor 88 is used to provide the current 63 in order to have a low impedance source for the control signal 76. Like all conventional transformers, the transformer having coils 91 and 92 operates only on alternating current. However, over the short period of time during which the control signal 76 will be held on, the direct current from capacitor 88 appears, for the transformer's purposes, to be one half cycle of alternating current. When the counter CNT reaches the second number N2, however, control logic LOGIC will generate "OFF" signal 78, which opens FET switch 85, shutting off the current 63 through the main coil 91.

When the current 63 stops flowing through the main transformer coil 91, no current 64 will be induced in the secondary coils 92. The FET's 94 will open back up, breaking the connection between the external power signal V5 and the control line 75. The control signal 76 will cease to flow, indicating the second control signal CS2.

Because a typical Q-switch may have approximately 20 picofarad capacitance, the second control signal CS2 will not immediately close the Q-switch. As shown in FIG. 1, the resistor 49 coupled across the Q-switch provides a path through which the capacitive charge in the Q-switch 45 may quickly bleed to ground. In the preferred embodiment, external power signal V4 is a ground reference, to which the resistor 49 is directly coupled. After the resistor 49 quickly drains any capacitive charge to ground, the Q-switch 45 of FIG. 1 will again hold off oscillation in the resonant cavity, and the long pulse LP1 will end.

The trigger signal 72 triggers the pump 43 to emit a pulse of pump energy 50. The pump energy 50 is absorbed by the material of the gain medium 42. The gain medium 42 releases the absorbed energy as laser light 51, which emerges from the laser device 40 as an output beam 60.

The Q-switch 45 switches the resonant cavity 40 on to allow generation of an output beam 60, and off to prevent oscillation in the cavity 40. Although the Q-switch 45 in FIG. 1 has a Pockels cell 48 and a quarter-wave plate 46, the present invention may be practiced with a variety of Q-switch types.

In its normal, unpowered state, the Q-switch 45 holds the resonant cavity off. However, while the control signal 76 arrives on the control line 75 from the controller 70, the Q-switch 45 allows oscillation in the resonant cavity. An output beam 60 exits the laser device 30 through the output coupler 41, and may either be a short-pulse or a long-pulse beam, according to the operation of the Q-switch 45 with respect to operation of the pump 43. When the controller 70 stops providing the control signal 76, the Q-switch 45 holds the resonant cavity off.

The controller 70 of the present invention provides an apparatus and a method for controlling the energy of long pulses of the output beam 60, without the need for controlling the pump energy 50, as explained with reference to FIGS. 1 and 3. The length of a first timing window P1 determines the amount of pump energy 50 which is coupled into a first long pulse LP1 of the output beam 60. At a first point in time T1, in response to a trigger signal TS1, the controller 70 issues a first control signal CS1. The trigger signal TS1 causes the pump 43 to fire, giving off a first pulse E1 of pump energy 50 over a period of time ET. The control signal CS1 is formed by raising the control signal 76 on the control line 75, to open the Q-switch 45. With the Q-switch 45 open, the rising pump energy 50 is coupled directly into the output beam 60, causing the output beam 60 to rise as the beginning a first long pulse LP1.

At a second point in time T2, the end of the first timing window P1, typically before the pump 43 has ceased producing the first pulse E1 of pump energy 50, the controller 70 issues a second control signal CS2 by lowering the control signal 76, to close the Q-switch 45. When the Q-switch 45 closes, the first long pulse LP1 quickly dies off. The energy F1 of the first long pulse LP1 is controlled because the controller 70 held open the Q-switch 45 for a first timing window P1 having a selected duration shorter than the duration ET of the energy pulse E1 provided by the pump 43. The total energy, absorbed in the gain medium 42 during the first pump energy pulse E1, available for powering the first long pulse LP1, is shown in FIG. 3 as the shaded area within the first pulse E1.

By holding the Q-switch 45 open for a longer timing window, the controller 70 can generate a long pulse with a higher total energy, without any adjustment of the pump 43. At a third point in time T3, a trigger signal TS3 causes the pump 43 to emit a second pulse E3 of pump energy, which will be identical to the first pulse E1. But, by waiting a longer period of time P3 between issuing control signals CS3 and CS4 than period P1, the controller 70 can generate a second long pulse LP3 of a higher energy F3 than the energy F1 of the first long pulse LP1.

Conversely, by shortening the timing window for which the Q-switch 45 is held open, the controller 70 can be used to generate a long pulse of lower total energy. This is illustrated in reverse by the energies F3 and Fi of long pulses LP3 and LP1. The Q-switch 45 was held open for a shorter timing window P1 in generating long pulse LP1 than the timing window P3 which generated long pulse LP3, so long pulse LP1 has a lower total energy F1 than the total energy F3 of long pulse LP3.

There is a maximum possible total energy F5 imposed on the long pulses of the output beam 60 by the maximum amount of pump energy 50 which the gain medium 42 can couple from one pulse E5 of pump energy 50 into a long pulse LP5. If the controller 70 holds the Q-switch 45 open for a timing window which is as long as the total duration of the pulse E5 of pump energy 50 which the pump 43 is capable of producing, the gain medium 42 will have coupled a maximum amount of the pump energy 50 into the long pulse LP5. Holding the Q-switch 45 open for a timing window P5 which is longer than the duration ET of the pump energy pulse E5 will not increase the total energy F5 of the long pulse LP5, as the pump energy will be exhausted shortly after the end of the pump pulse E5.

One embodiment of a method for controlling the length of the timing window, and thus the energy of a long pulse, is explained with reference to FIGS. 2 and 3. A technician (not shown) selects a desired value of a long pulse by entering the value into the timer unit 80, via the input device 86. The value may, in various embodiments, indicate either the energy of the long pulse or the length of the timing window. The technician presses the "up" button 82 to increase the desired value, and the "down" button 83 to decrease it. Other input devices may be used within the scope of this invention, such as a ten-key numerical keypad, which may be used to enter the value directly.

The value is displayed on the LED array 84, and as the technician increases or decreases the value via button 82 or 83, respectively, the LED array 84 reflects the changes. In the best mode, the LED array 84 shows the actual value selected, but other display formats are possible. For example, LED array 84 could simply output one of a given set of readings such as "A", "B", etc., which could correspond to particular total energies or timing window lengths, according to a predetermined definition and chart.

The value entered through buttons 82 and 83 is accepted by the control logic LOGIC of the digital timer 81. The control logic LOGIC mathematically selects values for first and second numbers N1 and N2 which define the duration of the timing window according to a predetermined algorithm. The algorithm takes into account the clock rate of the logic LOGIC, the pump pulse duration ET, and the desired value of the long pulse LP1. The algorithm selects the numbers N1 and N2 such that the logic LOGIC will count from the first number N1 to the second number N2 in an amount of time equal to the desired duration of the timing window. By holding the Q-switch 45 open for just that particular amount of time, the controller 70 will generate a long pulse LP1 of the desired value. The controller accomplishes this by issuing the first control signal CS1 in immediate response to the trigger signal from the external trigger unit 20, then, after counting from the first number N1 to the second number N2, issuing the second control signal CS2. By starting from a constant first number N1, such as zero, for all timing window lengths, the digital timer 81 need only calculate the second number N2 in order to vary the length of the timing window.

While the present invention has been described with reference to specific preferred embodiments thereof, and in conjunction with a particular laser device and Q-switch, it will be understood by those skilled in the art that the suggested changes and various other changes in form and detail may be made without departing from the scope and spirit of the invention itself.

I claim:

1. An apparatus operating a laser device, having a long-pulse mode, to control long pulses of laser light emitted from said laser device, said laser device including a pump, a gain medium, and a Q-switch disclosed in a resonant cavity, said pump supplying constant pulses of pump energy to said gaim medium during a first period of time said apparatus comprising: a controller means for adjustably controlling a timing window which demarcates operation of said Q-switch;said controller means including:

means for indicating an amount of a desired pump energy coupled into said long pulses;

means for determining,responsive to said amount of coupled pump energy,said timing window,which begins substantially at the beginning of said first period of time;and means for holding said Q-switch open during said timing window.

2. The apparatus of claim 1 wherein:

said means for indicating further comprises means for inputting a representation of said desired energy, such that said desired energy is in a range from a low energy to a high energy;

on a first operation of said laser device, said means for indicating determines a first timing window from input of a representation of a first desired energy into said means for inputting, to couple a first amount of pump energy into said first long pulse;

on a second operation of said laser device to control a second long pulse a second timing window from input of a representation of a second desired energy into said means for inputting, to couple a second amount of pump energy into said second long pulse; and said first desired energy being higher than said second desired energy, and said first timing window being longer than said second timing window.

3. An apparatus operating a Q-switch of a laser device, said laser device operating in a long-pulse mode and having a pump which generates pulses of pump energy, wherein said apparatus controls an intensity of a long pulse of laser light from said device, said apparatus comprising:

input means for inputting a desired value of an output pulse in said apparatus;

means, responsive to said input means, for generating from said desired value a timing window;

timer means for indicating the passage of said timing window from a first point in time to a second point in time; and driver means, coupled to said timer means, for opening said Q-switch at said first point in time and for closing said Q-switch at said second point in time, to couple said pulse of pump energy into said long pulse during said timing window.

4. The apparatus of claim 3 wherein:

said input means comprises first and second button means for incrementing and decrementing said value, respectively; and said apparatus further comprises a display means, responsive to said input means, for displaying said value as incremented or decremented by said button means.

5. The apparatus of claim 3 wherein said timer means comprises:

means for providing a clock pulse at regular intervals of time, said timer means operating in response to said clock pulse;

logic means for calculating, from said desired value, a first and a second number according to a predetermined algorithm; and digital counter means, responsive to said clock pulse, for stepping a count from said first number toward said second number by one increment each clock pulse during said timing window, such that said count equals said first number at said first point in time and said count equals said second number at said second point in time.

6. The apparatus of claim 5 wherein said pump operates in response to trigger signals, and wherein:

said timer means fixes said first point in time in response to a trigger signal;

said timer means provides an ON signal when said count starts at said first number and an OFF signal when said count reaches said second number; and said driver means provides, responsive to said ON signal, a first control signal to open said Q-switch, and, responsive to said OFF signal, a second control signal to close said Q-switch.

7. A method of operating a controller to control the amount of pump energy which is coupled into an output pulse, said output pulse being generated by a laser device having a pump which provides pulses of pump energy and an openable and closable Q-switch responsive to said controller, said Q-switch coupling said pump energy into said output pulse only when said Q-switch is open, said method comprising the ordered steps of:

inputting into said controller a desired value of said output pulse;

determining, from said value, a timing window defining a period of time;

triggering operation of said pump;

substantially simultaneously with said triggering step, opening said Q-switch;

waiting said period of time; and closing said Q-switch thereby precisely controlling long pulse beam intensity in said laser device.

8. The method of claim 7 wherein:

said controller further includes an input device having a first and a second button, and an output device having a digital readout;

said inputting step includes the step of selectively pressing said first button to increment said value or said second button to decrement said value; and said method further comprises, after said inputting step and responsive to said pressing step, the step of displaying said value, as incremented or decremented, on said digital readout.

9. The method of claim 7 wherein:

said value represents a desired total energy of said output pulse.

10. The method of claim 7 wherein:

said value represents a desired duration of said timing window.

11. The method of claim 7 wherein said determining step will determine, (i) from a first inputted value, a first timing window, (ii) from a second inputted value which is greater than said first inputted value, a second timing window which is longer than said first timing window, and (iii) from a third inputted value which is less than said first inputted value, a third timing window which is shorter than said first timing window, such that said output pulse is generated with a energy determined according to said waiting step.

12. The method of claim 7 wherein said opening step comprises the steps of:

providing an ON signal by said controller;

responsive to said ON signal, closing a driver switch of said controller;

responsive to said closing of said driver switch, coupling a power signal to said Q-switch, to open said Q-switch.

13. The method of claim 12 wherein said closing step comprises the steps of:

providing an OFF signal by said controller;

responsive to said OFF signal, opening said driver switch;

responsive to the opening of said driver switch, ceasing to provide said control signal, to close said Q-switch.

14. An apparatus controlling an output pulse from a laser device having a pump and a Q-switch, said laser device operating in a long-pulse mode, said Q-switch having a control line and being responsive to an external power signal, said apparatus comprising:

timer means for providing an ON signal, then waiting a period of time, and then providing an OFF signal, said timer means having, (i) input means for inputting a desired value of said output pulse, (ii) display means, responsive to said input means, for displaying a representation of said value, (iii) logic means for translating said value to a number, (iv) means for providing a clock signal, and (v) digital counter means, responsive to said clock signal, for counting to said number to accomplish said waiting; and driver means, coupled to said timer means, for providing control signals on said control line, wherein, (i) responsive to said ON signal from said timer means, said driver means provides a first control signal to open said Q-switch, and (ii) responsive to said OFF signal from said timer means, said driver means provides a second control signal to close said Q-switch.

15. The apparatus of claim 14 wherein said driver further comprises:

transformer means for generating a current;

switch means, coupled to said timer means, for closing and opening responsive to said ON and OFF signals, respectively, wherein if said switch means is closed said transformer means will generate said current and if said switch means is open then said transformer means will not generate said current; and said driver means further comprises at least one driver transistor with source and drain leads, one lead of which is coupled to receive said external power signal and the other lead of which is coupled to said control line, and a ground lead coupled to said transformer means to receive said current, such that receipt of said current closes said at least one driver transistor and connects said external power signal to said control line to open said Q-switch.

16. The apparatus of claim 15 wherein said at least one driver transistor further comprises:

a plurality of driver transistors connected serially, source lead to drain lead, each driver transistor having a ground lead coupled to said transformer to receive said current, a first driver transistor of said plurality having one lead of a source lead or drain lead coupled to said control line, and a last driver transistor of said plurality having the other lead of a source lead or drain lead coupled to receive said external power signal.

17. The apparatus of claim 14, wherein said laser device further includes a trigger unit which provides trigger signals to induce operation of said pump, and wherein:

said timer means both provides said ON signal and begins said waiting in response to and substantially simultaneously with a trigger signal from said trigger unit.

* * * * *